(12) United States Patent
Guhde et al.

(10) Patent No.: US 6,270,884 B1
(45) Date of Patent: Aug. 7, 2001

(54) WATER-REDUCIBLE COATING COMPOSITION FOR PROVIDING CORROSION PROTECTION

(75) Inventors: Donald J. Guhde, Euclid; Terry E. Dorsett, Chardon, both of OH (US); Etienne Maze, Breuil le Vert (FR); Victor V. Germano, Mentor; Walter H. Gunn, Painesville, both of OH (US)

(73) Assignee: Metal Coatings International Inc., Chardon, OH (US)

( * ) Notice: Subject to any disclaimer, the term of this patent is extended or adjusted under 35 U.S.C. 154(b) by 0 days.

(21) Appl. No.: 09/366,268

(22) Filed: Aug. 2, 1999

(51) Int. Cl.⁷ .................. B32B 5/16; C08F 2/46
(52) U.S. Cl. ............ 428/323; 106/14.11; 106/14.21; 106/14.41; 106/14.44; 427/487; 427/515; 427/517; 428/331; 428/341; 428/450
(58) Field of Search .............. 428/323, 331, 428/341, 450; 427/487, 515, 517; 106/14.11, 14.21, 14.41, 14.44

(56) References Cited

U.S. PATENT DOCUMENTS

| | | | |
|---|---|---|---|
| 3,592,699 | 7/1971 | Steinbrecher et al. | 148/6.2 |
| 3,671,331 | 6/1972 | Malkin et al. | 148/6.2 |
| 3,687,738 | 8/1972 | Malkin | 148/6.2 |
| 3,730,746 | 5/1973 | Boaz | 106/287 SE |
| 3,776,881 | 12/1973 | Lerner et al. | 260/37 SB |
| 3,907,608 | 9/1975 | Barrett et al. | 148/6.2 |
| 3,940,280 | 2/1976 | de Ridder | 106/193 M |
| 4,098,749 | 7/1978 | Hoshino et al. | 260/30.6 R |
| 4,213,886 | 7/1980 | Turner | 260/29.6 MM |
| 4,218,354 | 8/1980 | Hayati et al. | 260/29.2 M |
| 4,266,975 | 5/1981 | Higashiyama et al. | 106/1.12 |
| 4,277,284 | 7/1981 | Ginsberg et al. | 106/1.05 |
| 4,365,003 | 12/1982 | Danforth et al. | 428/552 |
| 4,476,260 | 10/1984 | Salensky | 523/402 |
| 4,555,445 | 11/1985 | Frey et al. | 428/340 |
| 4,904,723 * | 2/1990 | Hanaoka et al. | 524/266 |
| 5,206,285 | 4/1993 | Castellucci | 524/588 |
| 5,283,280 | 2/1994 | Whyte et al. | 524/559 |
| 5,300,323 | 4/1994 | Ahmed | 427/327 |
| 5,389,405 | 2/1995 | Purnell et al. | 427/387 |
| 5,412,011 | 5/1995 | Morris et al. | 524/261 |
| 5,759,629 * | 6/1998 | Van Ooij et al. | 427/384 |
| 5,801,217 * | 9/1998 | Rodzewich et al. | 523/409 |
| 5,868,819 | 2/1999 | Guhde et al. | 106/14.14 |
| 6,040,054 * | 3/2000 | Odashima et al. | 428/413 |
| 6,203,854 * | 3/2001 | Affinito | 427/327 |

FOREIGN PATENT DOCUMENTS

| | | | |
|---|---|---|---|
| 0108536 | 10/1983 | (EP) | C23F/11/08 |
| 1360451 | 7/1974 | (GB) | C08G/47/04 |
| 52-086424 | 7/1977 | (JP) | C09D/5/10 |
| 52-086425 | 7/1977 | (JP) | C09D/5/10 |
| 53-018639 | 2/1978 | (JP) | C09D/5/10 |
| 53-14746 | 2/1978 | (JP) . | |
| 53-042220 | 4/1978 | (JP) | C09D/5/12 |
| 55-142063 | 11/1980 | (JP) | C09D/5/12 |
| 59-177177 | 10/1984 | (JP) | B05D/7/14 |
| 4-046932 | 2/1992 | (JP) | C06G/77/20 |
| WO 95/21277 | 8/1995 | (WO) | C23C/22/05 |

* cited by examiner

*Primary Examiner*—Hoa T. Le
(74) *Attorney, Agent, or Firm*—John J. Freer

(57) ABSTRACT

There is disclosed a water-reducible, chrome-free coating composition for providing corrosion protection to a substrate, such as a metal substrate. The deposited coating film is corrosion-resistant and, for coated articles which are threaded, e.g., steel fasteners, the coating provides a non-thread-filling coating. The coating composition contains particulate metal, such as particulate zinc or aluminum. Although substituents can be separately packaged, the composition is virtually always a one-package coating composition. The composition is water-based, while also containing low-boiling organic liquid. The composition also contains water-reducible organofunctional silane, particularly an epoxy functional silane, as a binding agent. The composition has highly desirable, extended shelf life. The composition can be easily applied in usual manner, such as dip-drain or dip-spin technique, and readily cures at elevated temperature.

22 Claims, No Drawings

WATER-REDUCIBLE COATING COMPOSITION FOR PROVIDING CORROSION PROTECTION

BACKGROUND OF THE INVENTION

A variety of at least substantially resin-free, chromium-containing coating compositions for protecting ferrous substrates are known. Of special interest are those which contain particulate metal. Representative coating compositions of this type that were initially developed could be quite simplistic, such as compositions containing essentially chromic acid and particulate metal in an alcohol medium, as disclosed in the U.S. Pat. No. 3,687,738.

A later development of particular effectiveness for providing a corrosion-resistant coating on metal substrates was the more complex composition such as shown in U.S. Pat. No. 3,907,608. The composition comprised chromic acid, or equivalent, a particulate metal of mainly zinc or aluminum, wetter and a liquid medium comprising water plus high-boiling organic liquid. The composition had very desirable coating characteristics when including a viscosity modifier such as a water-soluble cellulose ether, as disclosed in U.S. Pat. No. 3,940,280.

The coating could be especially useful as an undercoating. Thus it has been taught to use such a more complex coating composition as an undercoating over ferrous surfaces. The coating is then provided with a silicate topcoating, as disclosed in U.S. Pat. No. 4,365,003. Another topcoating that could be utilized is a weldable primer, most notably a zinc-rich primer, which may be typically applied before electrical resistance welding of the substrate, as discussed in the hereinbefore mentioned U.S. Pat. No. 3,940,280.

It has been known that where coating compositions could contain the particulate metal as untreated aluminum flake, such flake can be unstable in water-based coating compositions. In such water-based coating compositions, standard aluminum flake will react with water in the composition to form hydrogen gas. One approach for avoiding this problem has been to coat the aluminum flake. One such coating is an acrylic coating formed by reacting mono-ethylenically unsaturated silane with acrylic monomers having amine hydroxyl or epoxy groups, as disclosed in U.S. Pat. No. 4,213,886. However, these products are specialty items tailored to provide a coating of good glamour appearance and have not found a wide acceptance.

Another approach to improving the coating composition was to consider the chromic acid constituent. As taught in U.S. Pat. No. 4,266,975 this constituency can be partially replaced by boric acid component. However, some chromic acid for the constituency is retained.

For coating compositions for providing corrosion-resistance to metal substrates, which compositions are of the particular type referred to as "wash primers", such have conventionally contained zinc chromate pigment. Attempts have been made with these primers to provide anti-corrosion primers free from chromium, thus reducing potential pollution problems. There has been proposed, as disclosed in U.S. Pat. No. 4,098,749, a coating composition containing a polyvinyl butyral resin, an organofunctional silane, a borate or polyphosphate compound and phosphoric acid. The composition may contain a metal powder as an optional ingredient and usually a phenolic resin. Such compositions, however, are not suitable as replacements for the above-discussed complex compositions of pulverulent metal and chromium-providing substance, owing in part to their resin content.

There has also been proposed the preparation of coating compositions that contain hydrolyzed organotrihydrocarbonoxy silane and a particulate metal. These compositions, such as disclosed in U.S. Pat. No. 4,218,354, can provide corrosion protection to a coated substrate. However, the silanes utilized are not water-reducible. Rather, they react with water and may readily form a gel, unless the reaction takes place in the presence of organic liquid. The compositions can thus have limited utility.

More recently, it has been taught in U.S. Pat. No. 5,868,819 that composition substituents which are epoxy functional silanes, and which are water-reducible, can be useful in forming compositions for coating metal substrates. The compositions rely on a variety of ingredients to provide for a chrome-free system.

As mentioned hereinabove, corrosion-resistant coatings can be combinations of undercoatings and topcoatings. The topcoatings can be solvent-based weldable zinc-rich primers. For the topcoatings, such as these zinc-rich primers, it has been proposed, as disclosed in U.S. Pat. No. 4,476,260, to enhance primer corrosion-resistance by formulating a primer to contain zinc pigment, a thermoplastic or thermosetting resin, an organosilane, and optionally aluminum trihydrate with one or more dispersing agents. Such compositions, however, are not suitable as replacements for the complex undercoating compositions, and would be useful in the combination of coatings as the zinc-rich topcoating.

It would, therefore, be desirable to provide a coating composition which could have the wide acceptance of the complex undercoating compositions. It would further be desirable to provide such compositions, which would avoid the pollution problems associated with the compositions which contain hexavalent chromium, as well as avoid compositions which are solvent-based.

SUMMARY OF THE INVENTION

The present invention offers a water-reducible coating composition, generally referred to herein as a water-based coating composition, having highly desirable characteristics such as providing a coating offering desirable corrosion-resistance on coated steel parts. In addition to corrosion-resistance, the deposited film has desirable coating adhesion on the substrate. For small, threaded parts, such as threaded fasteners, the coating can be a non-thread filling coating. The composition is chrome-free in addition to being water-reducible. Coating application equipment can thereby be readily cleaned and the cleaning liquid can be easily and economically disposed. The coating composition of the present invention can virtually always readily be a one-package composition, thereby providing ease of preparation, storage and transport as well as use. The composition lends itself to extended storage stability and offers enhanced flexibility in choice of ingredients for preparing a most economical and efficient composition.

In one aspect, the invention is directed to a chrome-free, stable and water-reducible coating composition for application to, and heat curing on, a substrate for providing corrosion protection thereto, which composition comprises:

(A) water in an amount supplying from about 20 to about 70 weight percent of the coating composition;

(B) low-boiling organic liquid;

(C) particulate metal;

(D) water-reducible, organofunctional silane binding agent containing alkoxy groups, which binding agent contributes from about 3 to about 20 weight percent of the total composition weight; and (E) wetting agent;

and with the proviso that the coating composition has a molar ratio of water to silane alkoxy groups above 4.5:1.

In another aspect, the invention is directed to the above-noted coating composition additionally containing one or more of typically boric acid component and/or corrosion-inhibiting substituent.

Another aspect of the invention is directed to a coated substrate protected with a chrome-free, corrosion-resistant coating of the deposited and cured film from the herein-described coating composition. In another aspect, the invention is directed to a method of preparing a corrosion-resistant coated substrate by applying the herein described coating composition to the substrate in an amount to provide at least about 500 milligrams per square foot ($mg/ft^2$) of coating on the substrate upon curing the applied composition on the substrate at a temperature up to about 650° F. for a time of at least about 5 minutes.

In a still further aspect, the invention is directed to preparing the coating composition by premixing silane binding agent with aqueous medium, or organic liquid, or both aqueous medium and organic liquid, and then using the resulting premix in subsequent processing comprising admixing particulate metal to provide the final coating composition.

DESCRIPTION OF THE PREFERRED EMBODIMENTS

The coating composition described herein, when prepared in final form for application to a substrate, will usually be referred to herein simply as the "coating composition" or "final coating composition". However, it may also be referred to as a "water-reducible coating composition". For supplying the liquid medium, sometimes referred to herein as the "aqueous medium", of the coating composition, there will always be used water in combination with organic liquid. It is contemplated that the composition can be infinitely dilutable with water. Because of this, the composition will generally be referred to herein as a water-based coating composition, although it will be understood that some organic liquid is present.

Water is present in the composition in an amount from at least about 20, and generally not above about 70 weight percent, basis total composition weight. use of less than about 20 weight percent of water can be inefficient for providing ease of composition formulation, while greater than about 70 weight percent of water is inefficient for providing a composition having ease of application. Although it will be understood that the composition is readily dilutable, it is preferred for efficiency and economy that the composition contain water in an amount from about 25, and more generally from about 30, to about 60 weight percent, basis total composition weight.

The organic liquid of the coating composition liquid medium is a low-boiling organic liquid, although there may be present some high-boiling organic liquids, so that the liquid medium may include mixtures of the foregoing. It was previously considered that serviceable compositions should contain high-boiling organic liquid as an important ingredient. Such was disclosed in U.S. Pat. No. 5,868,819. Suitable coating compositions can also be produced that contain low-boiling organic liquid, while retaining desirable composition characteristics, such as composition stability. The low-boiling organic liquids have a boiling point at atmospheric pressure below about 100° C., and are preferably water-soluble. Such may be represented by acetone, or low molecular weight alcohols such as methanol, ethanol, n-propylalcohol and isopropylalcohol, and further include ketones that boil below 100° C., such as water-soluble ketones, e.g., methyl ethyl ketone.

Generally, the organic liquid will be present in an amount from about 1 to about 30 weight percent, basis total composition weight. Presence of such organic liquid, particularly in amounts above about 10 weight percent, e.g., at 15 to 25 weight percent, may enhance the corrosion-resistance of the coating, but use of greater than about 30 weight percent can become uneconomical. Preferably, for economy plus ease of composition preparation, acetone will supply the low-boiling organic liquid and will be present in an amount between about 1 and about 10 weight percent of the total composition.

It is to be understood that the organic liquid is typically provided to the composition as a separate component, but that some to all of the liquid may be introduced in another manner. Where metal particles have been prepared as metal flake in organic liquid medium, the resulting particulate metal may be in paste form. Where such paste form metal is used, it can provide some portion to all of the organic liquid to the coating composition. For example, aluminum flake paste can be 25 weight percent dipropylene glycol, a high-boiling organic liquid, and readily contribute one weight percent of such glycol to the overall composition. For contributing particulate aluminum, the use of aluminum flake paste can be economical. Hence, for economy, those compositions which contain aluminum flake may typically have a combination liquid medium that includes high-boiling organic liquid.

Generally, representative high-boiling organic liquids contain carbon, oxygen and hydrogen. They may have at least one oxygen-containing constituent that may be hydroxyl, or oxo, or a low molecular weight ether group, i.e., a $C_1$–$C_4$ ether group. Since water dispersibility and preferably water solubility is sought, high molecular weight polymeric hydrocarbons are not particularly suitable, and advantageously serviceable hydrocarbons contain less than about 15 carbon atoms and have a molecular weight of 400 or less. Particular hydrocarbons, which may be present as high-boiling organic liquid, include tri- and tetraethylene glycol, di- and tripropylene glycol, the monomethyl, dimethyl, and ethyl ethers of these glycols, low molecular weight liquid polypropylene glycols, as well as diacetone alcohol, the low molecular weight ethers of diethylene glycol, and mixtures of the foregoing. For economy, ease of composition preparation, and for reduced volatile constituents in the composition, dipropylene glycol is the preferred high-boiling organic liquid and is preferably present in an amount between about 1 to about 10 weight percent of the total composition. Where the organic liquid is a mixture of high-boiling organic liquid with low-boiling organic liquid, such a mixture can be represented by acetone plus dipropylene glycol.

The particulate metal of the coating composition can, in general, be any metallic pigment such as finely divided aluminum, manganese, cadmium, nickel, stainless steel, tin, ferroalloys, magnesium or zinc. The particulate metal is most particularly zinc dust or zinc flake or aluminum dust or aluminum flake. The particulate metal may be a mixture of any of the foregoing, as well as comprise alloys and intermetallic mixtures thereof. Flake may be blended with pulverulent metal powder, but typically with only minor amounts of powder. The metallic powders typically have particle size such that all particles pass 100 mesh and a major amount pass 325 mesh ("mesh" as used herein is U.S. Standard Sieve Series). The powders are generally spherical as opposed to the leafing characteristic of the flake.

Where there is combined in the composition particulate zinc with aluminum, the aluminum may be present in very minor amount, e.g., from as little as about 2 to about 5 weight percent, of the particulate metal, and still provide a coating of bright appearance. Usually the aluminum will contribute at least about 10 weight percent of the particulate metal. Thus, frequently, the weight ratio of aluminum to zinc in such a combination is at least about 1:9. On the other hand, for economy, the aluminum will advantageously not contribute more than about 50 weight percent of the zinc and aluminum total, so that the aluminum to zinc weight ratio can reach 1:1. The particulate metal content of the coating composition will not exceed more than about 35 weight percent of the total composition weight to maintain best coating appearance, but will usually contribute at least about 10 weight percent to consistently achieve a desirable bright coating appearance. Advantageously, where aluminum is present, and especially where it is present without other particulate metal, the aluminum will provide from about 1.5 to about 35 weight percent of the total composition weight. Typically, when particulate zinc is present in the composition, it will provide from about 10 to about 35 weight percent of the total composition weight. As has been discussed hereinbefore, especially where the metal has been prepared in flake form in liquid medium, the metal can contribute some liquid in minor amount, e.g., dipropylene glycol or mineral spirits, or some liquid even in trace amount. Particulate metals contributing liquid are usually utilized as pastes, and these pastes can be used directly with other composition ingredients. However, it is to be understood that the particulate metals may also be employed in dry form in the coating composition.

In addition to the particulate metal, another necessary ingredient in the water-reducible coating composition is silane. By use herein of the word "silane", or by using the term "silane binding agent", it is meant a water-reducible, organofunctional silane. To be water-reducible, the silane should be readily dilutable with water and is preferably completely dilutable with water. The useful silane is not one where the silane must have a cosolvent present when reduced with water, so as to prevent gellation on water reduction, or to prevent the formation of a precipitate. For example, silanes such as the organotrihydrocarbonoxy silanes of U.S. Pat. No. 4,218,354, and as represented by methyltriethoxy silane, are not useful herein as they must be blended with a cosolvent and water, e.g., ethylene glycol monoethyl ether and water. For these silanes, the silane and water react such that without the cosolvent, fast gellation would be typical. In this regard, the silanes which are useful herein are non-gelling, water-reducible silanes. Serviceable silanes may, however, be reactable with water so long as such reaction does not quickly proceed to gellation or precipitate formation. Combining with water then provides for the water dilution of the silane, and subsequent ease of mixing with other coating composition ingredients, without deleterious, intermediate activity, e.g., precipitate formation or composition gellation, or both.

In suitable silanes, the organofunctionality can be represented by vinyl, e.g., as in vinyltrimethoxysilane, or methacryloxy, such as in methacryloxypropyl-trimethoxysilane, and amino, as in 3-aminopropyltrimethoxysilane, but is preferably epoxy functional for enhanced coating performance as well as composition stability.

The agent generally contains the $-Si(OCH_3)_3$ functionality, or the $-Si(OCH_2CH_3)_3$ or $-Si(OCH_2CH_2CH_3)_3$ functionality. The silanes utilized have heretofore usually been employed as surface treatment agents. It was unexpected to find that, in the compositions of the present invention, they were serving as binding agents. Because of this, they are often referred to herein as silane binding agents. They can also serve to stabilize the coating bath against autogenous, deleterious reaction. The silane appears to bind and passivate the particulate metal so that coating composition bath stability is enhanced. Moreover, in the applied coating, coating adhesion and corrosion-resistance are improved. To provide these characteristics, the silane will contribute from about 3 weight percent to about 20 weight percent of the total composition weight. Less than about 3 weight percent of the silane will be insufficient to desirably enhance bath stability as well as coating adhesion. on the other hand, greater than about 20 weight percent of the silane will be uneconomical. Generally, for enhanced bath stability coupled with desirable economy, the silane will contribute from about 5 weight percent to about 12 weight percent of the total composition weight. The silane is advantageously easily dispersible in aqueous medium, and is preferably soluble in such medium. Preferably, the useful silane is an epoxy functional silane such as beta-(3,4-epoxycyclohexyl) ethyltrimethoxy-silane, 4(trimethoxysilyl) butane-1,2 epoxide or gamma-glycidoxypropyltrimethoxysilane.

The silane will be present in an amount in relation to the water to provide a mole ratio of water, to the alkoxy groups present on the silane atom, of greater than 4.5:1. A ratio that is not greater than 4.5:1 may provide a coating composition that is thick and difficult to produce and use. Advantageously, this ratio will be above about 5:1 and preferably for best ease of coating composition preparation will be above about 6:1. For this molar ratio, the moles of alkoxy groups are the groups such as have the formula as disclosed hereinabove with reference to the silane functionality, e.g., the formula $-OCH_3$. These may also sometimes be referred to herein as carbonoxy or as hydrocarbonoxy groups.

For the purpose of helping the dispersing of the particulate metal, there is added a dispersing agent, i.e., surfactant, serving as a "wetting agent" or "wetter", as such terms are used herein. Suitable such wetting agents or mixture of wetting agents can include nonionic agents such as the nonionic alkylphenol polyethoxy adducts, for example. Representative compounds of these agents are more specifically described in the examples. Also, there can be used anionic wetting agents, and these are most advantageously controlled foam anionic wetting agents. Serviceable such wetting agents or mixture of wetting agents can include anionic agents such as organic phosphate esters, as well as the diester sulfosuccinates as represented by sodium bistridecyl sulfosuccinate. The amount of such wetting agent is typically present in an amount from about 0.01 to about 3 weight percent of the total coating composition.

The necessary coating composition ingredients are the above-discussed ingredients, i.e., water, low-boiling organic liquid, particulate metal, silane binding agent and wetting agent. It is contemplated that the coating composition may also contain additional ingredients, e.g., the above-mentioned high-boiling organic liquid. As additional ingredients, the coating composition may also contain what is usually referred to herein as a "boric acid component", or "boron-containing compound". For the "component" or for the "compound", as the terms are used herein, it is convenient to use orthoboric acid, commercially available as "boric acid", although it is also possible to use various products obtained by heating and dehydrating orthoboric acid, such as metaboric acid, tetraboric acid and boron oxide. Moreover, usually only as a minor amount, although it can be more, there can be used salts, e.g., up to 40 weight percent or more of the boric acid component may be supplied by borax, zinc borate or the like. The boric acid component should be present in an amount of at least about 0.1 weight percent to provide demonstrable enhancement of the corrosion-resistance characteristic of the coating. Such component may be present in an amount up to about 10 weight percent or more of the composition. Advantageously, for efficient corrosion-resistance, the composition will contain from about 0.2 to about 5 weight percent boric acid component, with from about 0.4 to about 0.8 weight percent being preferred.

It is contemplated that the composition may contain a pH modifier, which is able to adjust the pH of the final composition. Usually, the composition, without pH modifier, will be at a pH within the range from about 6 to about 7.5. At a pH above about 7.5, the resulting coating may demonstrate a deleterious lack of adhesion on a coated substrate. It will be understood that as the coating composition is produced, particularly at one or more stages where the composition has some, but less than all, of the ingredients, the pH at a particular stage may be below 6. However, when the complete coating composition is produced, and especially after it is aged, which aging will be discussed hereinbelow, then the composition will achieve the requisite pH. Where a modifier is used, the pH modifier is generally selected from the oxides and hydroxides of alkali metals, with lithium and sodium as the preferred alkali metals for enhanced coating integrity; or, it is selected from the oxides and hydroxides usually of the metals belonging to the Groups IIA and IIB in the Periodic Table, which compounds are soluble in aqueous solution, such as compounds of strontium, calcium, barium, magnesium, zinc and cadmium. The pH modifier may also be another compound, e.g., a carbonate or nitrate, of the foregoing metals.

The coating composition may also contain thickener. It had previously been considered that thickener was an important ingredient, as discussed in U.S. Pat. No. 5,868,819. It has, however, now been found that serviceable coating compositions can be produced which do not contain thickener, and desirable coating composition characteristics such as storage stability can nevertheless be achieved. For the present invention, the thickener is thus an optional substituent. The thickener, when present, can contribute an amount of between about 0.01 to about 2.0 weight percent of thickener, basis total composition weight. This thickener can be a water-soluble cellulose ether, including the "Cellosize" (trademark) thickeners. Suitable thickeners include theethers of hydroxyethylcellulose, methylcellulose, methylhydroxypropylcellulose, ethylhydroxyethylcellulose, methylethylcellulose or mixtures of these substances. Although the cellulose ether needs to be water soluble to augment thickening of the coating composition, it need not be soluble in the organic liquid. When thickener is present, less than about 0.02 weight percent of the thickener will be insufficient for imparting advantageous composition thickness, while greater than about 2 weight percent of thickener in the composition can lead to elevated viscosities which provide compositions that are difficult to work with. Preferably, for the best thickening without deleterious elevated viscosity, the total composition will contain from about 0.1 to about 1.2 weight percent of thickener. It will be understood that although the use of a cellulosic thickener is contemplated, and thus the thickener may be referred to herein as cellulosic thickener, some to all of the thickener may be another thickener ingredient. Such other thickening agents include xanthan gum, associative thickeners, such as the urethane associative thickeners and urethane-free nonionic associative thickeners, which are typically opaque, high-boiling liquids, e.g., boiling above 100° C. Other suitable thickeners include modified clays such as highly beneficiated hectorite clay and organically modified and activated smectite clay, although such is not preferred. When thickener is used, it is usually the last ingredient added to the formulation.

The coating composition may contain further additional ingredients in addition to those already enumerated hereinabove. These other ingredients may include phosphates. It is to be understood that phosphorous-containing substituents, even in slightly soluble or insoluble form, may be present, e.g., as a pigment such as ferrophos. The additional ingredients will frequently be substances that can include inorganic salts, often employed in the metal coating art for imparting some corrosion-resistance or enhancement in corrosion-resistance. Materials include calcium nitrate, dibasic ammonium phosphate, calcium sulfonate, 1-nitropropane lithium carbonate (also useful as a pH modifier), or the like, and, if used, these are most usually employed in the coating composition in a total combined amount of from about 0.1 to about 2 weight percent. Greater than about 2 weight percent of such additional ingredient may be utilized where it is present for a combination of uses, such as lithium carbonate used as a corrosion-inhibitor and also as a pH adjusting agent. Most usually the coating composition is free from these further additional ingredients.

As mentioned hereinabove, the composition should be chrome-free, which may also be referred to herein as "chromium-free". By being chrome-free it is meant that the composition preferably contains no chromium ion, e.g., as trivalent or hexavalent chromium, including such chromium in ion form as could be contributed by chromic acid or dichromate salts. If any hexavalent chromium is present, advantageously it should not exceed trace amounts, e.g., be present to provide less than 0.1 milligram of chromium per square foot of coating, for best environmental concerns. It is to be understood that the composition may contain chromium in non-soluble form, as for example metallic chromium contributed as part of a particulate metal which might be in alloy form or present as an intermetallic mixture. Where compositions herein have been described as resin-free, such are preferably resin-free excepting for trace amounts of resin, but such may include minor amounts of resin, such as a few weight percent, e.g., 1 to 2 weight percent, of resin. By resin it is meant the generally synthetic, polymeric resins, which are typically used as binders in paint systems, but is not meant to include either thickening agent, when present, or to include the silane binding agent.

The coating composition can be formulated in a variety of procedures. For example, as an alternative to directly using the silane binding agent in a concentrated form, the silane may be utilized as a more dilute premixture of the silane, such as the silane mixed with a diluent, e.g., a diluent selected from the substituents providing the coating composition liquid medium, such as water, or water plus boric acid component, or water plus low-boiling organic liquid including acetone. The resulting silane-containing, more dilute premixture, containing from as little as 10 weight percent, up to as much as 90 weight percent or more, of silane, can be blended with other composition ingredients.

Additionally, it is contemplated that the silane binding agent may initially be mixed together with any of the other necessary composition ingredients. Hence, the silane in a liquid form, such as in a diluent, may be mixed with other coating composition ingredients which are in solid or liquid form. However, it will most always be present in any composition before particulate metal is added to that composition.

As an additional example of a coating composition preparation procedure, a precursor mixture might be prepared from the organic liquid, which may be present together with wetting agent, while further including particulate metal. Such precursor mixture, which will be referred to herein as the "precursor mixture", will typically contain from about 25 to about 40 weight parts of organic liquid, from about 4 to about 8 weight parts of wetting agent and a balance of particulate metal, basis 100 weight parts of precursor mixture. To 100 weight parts of this precursor mixture, there can be added sufficient silane binding agent, preferably diluted with water, such as in the more dilute premixture discussed hereinabove, to provide from about 3 to about 20 weight percent of the agent, basis weight of the final coating composition. After addition of the silane binding agent, the composition may further be diluted to contain up to about 70 weight percent of aqueous medium, basis final coating composition weight.

Packaging concepts, as well as formulation considerations for how the coating composition is prepared, can be taken into consideration when bringing composition ingredients together. Thus, it is contemplated that less than all of the coating composition ingredients may be present in other composition premixtures. Such can include, for example, wetting agent, or wetting agent plus boric acid component, or aqueous medium plus boric acid component. Such premixtures may be made up with liquid which may or may not include aqueous medium, and may or may not include organic liquid. A representative premixture will be more particularly discussed hereinbelow in regard to packaging. It is contemplated that a premixture may be blended with the above-mentioned precursor mixture of organic liquid, wetting agent and particulate metal. Premixtures can be resin-free. Resin-free, premixtures may sometimes be referred to hereinafter for convenience as a "preblended premix". It will be understood that the above mentioned precursor mixture, as well as the various premixtures, are often contemplated to be made as distinct packages, such as for storage or shipping, or both.

Even considering storage stability, the composition is preferably always a one-package formulation of all coating composition ingredients. It will, however, be understood that, as mentioned hereinbefore, a precursor mixture, containing the ingredients particulate metal, organic liquid and wetting agent, can be prepared and may be separately packaged. Other ingredients may also be available as a pre-blended package of ingredients, e.g., silane binding agent, with one or both of wetter and boric acid component, which all could be in a liquid medium. This package could constitute one of the possible above-mentioned premixtures. This package, when wetter is present and boric acid may or may not be present, may contain such ingredients in the following weight percents, all basis 100 percent total package weight: about 15 to about 60 percent silane, 0 to about 10 percent (typically about 2 to about 6 percent) boric acid component, 0 to about 5 percent corrosion-inhibitor, about 10 to about 30 percent wetting agent, 0 to about 15 percent thickener and a balance, e.g., about 20 to about 30 percent of liquid, such as organic liquid. The package may have sufficient water added thereto to provide as much as about 50 or more, but more usually up to 30, weight percent aqueous medium, basis the weight of a package containing water.

It will be understood that the final coating composition, as well as separate pre-blended packages, may be prepared in concentrated form. Thus, although water will be present in the coating composition in an amount from about 20 weight percent, the package formulation discussed immediately hereinabove could be made up with as little as 5 to less than 20 weight percent water. Then, the package would be blended with additional water to provide up to even as much as about 70 weight percent water in the final coating composition.

Where particulate aluminum will be used in the coating composition, and especially where both particulate zinc and particulate aluminum will be employed, a variant of the above packaging considerations may be utilized. It is most preferred to use such a zinc and aluminum combination and to start with a mixture, susceptible to packaging, of about 10 to 15 percent wetting agent, about 2 to 5 percent boric acid component, about 15 to 35 percent silane binding agent and a balance of aqueous medium to provide 100 weight percent total mixture weight. Into this mixture, there can then be dispersed particulate metal, usually as a flake, e.g., zinc flake. Additional aqueous medium may be added, whereby the resulting metal-containing dispersion can contain about 25 to 45 weight percent of the particulate metal and from as much as about 40, up to about 60, weight percent aqueous medium, both basis the total weight of the resulting metal-containing dispersion.

Typically, there is then separately prepared an additional package precursor blend to introduce the particulate aluminum into the final coating composition. This particulate aluminum will generally be aluminum flake, but it is to be understood that other metals in flake form, e.g., zinc flake, may be present with the aluminum in this precursor blend. This additional package can contain from about 20 to about 35 weight percent (typically about 25 to about 30 weight percent) of silane binding agent, from about 20 to about 35 weight percent (typically from about 25 to about 30 weight percent) of organic liquid, and from about 30 to about 50 weight percent (typically from about 35 to about 45 weight percent) of particulate aluminum, e.g., aluminum in flake form, to provide the 100 weight percent total for this additional package. Then, usually, from about 5 weight percent to about 20 weight percent of this additional package is combined with from about 80 to about 95 weight percent of the hereinbefore described metal-containing dispersion to prepare, typically, a particulate zinc plus aluminum flake final coating composition.

Even when made as a one-package formulation, the final coating composition has highly desirable storage stability. This confirms the binding ability of the silane to protect the particulate metal from deleterious reaction with other composition ingredients during extended storage. Such extended shelf stability was unexpected, owing to the recognized reaction problems of particulate metal in water-reducible systems, e.g., the gassing of aqueous compositions containing particulate zinc. However, even after storage as a single package, compositions of the present invention can be unpackaged, prepared for coating application as by brisk stirring, then readily applied. Resulting coatings can have the desirable corrosion-resistance, and often the other coating characteristics, of coatings applied from freshly prepared compositions.

Where a bath of the coating composition has been prepared, it has been found desirable to age this blend. Aging can help provide better coating performance. Usually, aging of the blend will be for at least 1 hour, and advantageously for at least about 2 hours to about 7 days, or more. Aging for less than 1 hour can be insufficient for developing desirable bath characteristics, whereas aging for greater than 7 days can be uneconomical.

The final coating composition, whether freshly prepared or after taken from storage, may be applied by various techniques, such as immersion techniques, including dip drain and dip spin procedures. Where parts are compatible with same, the coating can be applied by curtain coating, brush coating or roller coating and including combinations of the foregoing. It is also contemplated to use spray technique as well as combinations, e.g., spray and spin and spray and brush techniques. Coated articles that are at an elevated temperature may be coated, often without extensive cooling, by a procedure such as dip spin, dip drain or spray coat.

The protected substrate can be any substrate, e.g., a ceramic or similar substrate, but is most particularly a metal substrate such as a zinc or iron, e.g., steel, substrate, an important consideration being that any such substrate withstand the heat curing conditions for the coating. By a "zinc" substrate it is meant a substrate of zinc or zinc alloy, or a metal such as steel coated with zinc or zinc alloy, as well as a substrate containing zinc in intermetallic mixture. Likewise, the iron of the substrate can be in alloy or intermetallic mixture form. Especially where such are metal substrates, which are most usually ferrous substrates, these may be pretreated, e.g., by chromate or phosphate treatment, prior to application of the undercoating. Thus, the substrate may be pretreated to have, for example, an iron phosphate coating in an amount from about 50 to about 100 mg/ft$^2$ or a zinc phosphate coating in an amount from about 200 to about 2,000 mg/ft$^2$.

After application of the coating composition to the substrate, it is preferred for best corrosion-resistance to subsequently heat-cure the applied coating. However, volatile coating substances may be initially simply evaporated from the applied coating, e.g., by drying before curing. Cooling after drying may be obviated. The temperature for such drying, which may also be referred to as precuring, can be within the range from about 100° F. up to not essentially above about 250° F. Drying times can be on the order of from about 2 to about 25 minutes.

For the substrates containing applied coating composition, the subsequent curing of the composition on the substrate will usually be a hot air oven cure, although other curing procedures can be used, e.g., infrared baking and induction curing. The coating composition will be heat-cured at elevated temperature, e.g., on the order of about 450° F., but usually greater, oven air temperature. The cure will typically provide a substrate temperature, usually as a peak metal temperature, of at least about 450° F. oven air temperatures may be more elevated, such as on the order of 650° F., but for economy, the substrate temperature need not exceed about 450° F. Curing, such as in a hot air convection oven, can be carried on for several minutes. Although cure times may be less than 5 minutes, they are more typically on the order of from about 10 to about 40 minutes. It is to be understood that cure times and temperatures can be effected where more than one coating is applied or where a subsequently applied, heat-cured topcoating will be used. Thus, shorter time and lower temperature cures can be employed when there will be applied one or more additional coatings or a topcoating that proceeds through an elevated temperature bake at a longer cure time. Also, where more than one coating is applied or a heat-curable topcoating will be applied, the first coating, or undercoating, may only need be dried, as discussed hereinabove. Then, curing can proceed after application of a second coating, or of a heat-cured topcoating.

The resulting weight of the coating on the metal substrate may vary to a considerable degree, but will always be present in an amount supplying greater than 500 mg/ft$^2$ of coating. A lesser amount will not lead to desirably enhanced corrosion-resistance. Advantageously, a coating of greater than about 1,000 mg/ft$^2$ of coated substrate will be present for best corrosion-resistance, while most typically between about 2,000 to 5,000 mg/ft$^2$ of coating will be present. In this coating, there will generally be present from about 400 mg/ft$^2$ to about 4,500 mg/ft$^2$ of particulate metal.

Before use, the coated substrate may be topcoated, e.g., with silica substance. The term "silica substance", as it is used herein for the topcoating, is intended to include both silicates and colloidal silicas. The colloidal silicas include both those that are solvent-based as well as aqueous systems, with the water-based colloidal silicas being most advantageous for economy. As is typical, such colloidal silicas can include additional ingredients, e.g., thickeners as, for example, up to about 5 weight percent of an above-discussed water-soluble cellulose ether. Also, a minor amount, e.g., 20 to 40 percent by weight and usually a lesser amount, of the colloidal silicas can be replaced by colloidal alumina. In general, the use of colloidal silicas will provide for heavier topcoats of silica substance over undercoated substrate materials. It is contemplated to use colloidal silicas containing up to 50 percent by weight solids, but typically, much more concentrated silicas will be diluted, for example, where spray application of the topcoat will be used.

When the topcoating silica substance is silicate, it may be organic or inorganic. The useful organic silicates include the alkyl silicates, e.g., ethyl, propyl, butyl and polyethyl silicates, as well as alkoxyl silicates such as ethylene glycol monoethyl silicate. Most generally for economy, the organic silicate is ethyl silicate. Advantageously, the inorganic silicates are used for best economy and corrosion-resistance performance. These are typically employed as aqueous solutions, but solvent-based dispersions may also be used. When used herein in reference to silicates, the term "solution" is meant to include true solutions and hydrosols. The preferred inorganic silicates are the aqueous silicates that are the water-soluble silicates, including sodium, potassium, lithium and sodium/lithium combinations, as well as other related combinations. Referring to sodium silicate as representative, the mole ratios of $SiO_2$ to $Na_2O$ generally range between 1:1 and 4:1. For best efficiency and economy, an aqueous-based sodium silicate is preferred as the silica substance. The use of silica substance as a topcoating has been described in U.S. Pat. No. 4,365,003, the disclosure of which is incorporated herein by reference.

Other ingredients may be present in the silica substance topcoating composition, e.g., wetting agents and colorants, and the composition may contain chrome substituents if desired, but can be chrome-free as defined hereinabove to provide a totally chrome-free coating. Substances that may be present can further include thickening and dispersing agents as well as pH adjusting agents, but all such ingredients will typically not aggregate more than about 5 weight percent, and usually less, of the topcoating composition so as to provide for enhanced coating composition stability coupled with augmented coating integrity. The silica substance topcoating may be applied by any of the above described various techniques for use with the coating composition, such as immersion techniques including dip drain and dip spin procedures.

By any coating procedure, the topcoat should be present in an amount above about 50 mg/ft² of coated substrate. For economy, topcoat weights for cured topcoating will not exceed about 2,000 mg/ft² of coated substrate. This range is for the cured silica substance topcoating. Preferably, for best coating efficiency and silica substance topcoat economy, the topcoat is an inorganic silicate providing from about 200 to about 800 mg/ft² of cured silicate topcoating.

For the silica substance topcoat curing, it is typical to select the curing conditions in accordance with the particular silica substance used. For the colloidal silicas, air drying may be sufficient; but, for efficiency, elevated temperature curing is preferred for all the silica substances. The elevated temperature curing can be preceded by drying, such as air drying. Regardless of prior drying, a lower cure temperature, e.g., on the order of about 150° F. to about 300° F., will be useful for the colloidal silicas and organic silicates. For the inorganic silicates, curing typically takes place at a temperature on the order of about 300° F. to about 500° F. In general, cure temperatures on the order of from about 150° F. to about 800° F. or more, as peak metal temperatures, may be useful. At the more elevated temperatures, cure times may be as fast as about 10 minutes, although longer cure times, up to about 20 minutes, are more usual. Also, articles can be topcoated with the silica substance topcoat while the articles are at elevated temperature, as from the curing of the water-reducible coating composition. Such could be done as by spray coat or dip drain, i.e., a dipping of the elevated temperature article into the topcoat composition, which can provide a quenching of the article. Upon removal from the topcoating composition, the article can be drained. Some to all of the topcoat curing can be achieved by the operation.

Before use, the coated substrate with the coating from the water-reducible coating composition may also be further topcoated with any other suitable topcoating, i.e., a paint or primer, including electrocoating primers and weldable primers, such as the zinc-rich primers that may be typically applied before electrical-resistance welding. For example, it has already been shown in U.S. Pat. No. 3,671,331 that a primer topcoating containing a particulate, electrically conductive pigment, such as zinc, is highly serviceable for a metal substrate that is first coated with another coating composition. Other topcoating paints may contain pigment in a binder or can be unpigmented, e.g., generally cellulose lacquers, resin varnishes, and oleoresinous varnishes, as for example tung oil varnish. The paints can be solvent-reduced or they may be water-reduced, e.g., latex or water-soluble resins, including modified or soluble alkyds, or the paints can have reactive solvents such as in the polyesters or polyurethanes. Additional suitable paints which can be used include oil paints, including phenolic resin paints, solvent-reduced alkyds, epoxies, acrylics, vinyl, including polyvinyl butyral, and oil-wax-type coatings such as linseed oil-paraffin wax paints.

Of special interest, the coated substrate with the coating from the water-reducible coating composition can form a particularly suitable substrate for paint deposition by electrocoating. The electrodeposition of film-forming materials is well known and can include electrocoating of simply a film-forming material in a bath or such a bath which may contain one or more pigments, metallic particles, drying oils, dyes, extenders, and the like, and the bath may be a dispersion or ostensible solution and the like. Some of the well known resinous materials useful as film-forming materials include the polyester resins, alkyd resins, acrylate resins, hydrocarbon resins, and epoxy resins, and such materials can be reacted with other organic monomers and/or polymers including hydrocarbons such as ethylene glycol, monohydric alcohols, ethers, and ketones.

Also of interest are polycarboxylic acid resins which can be solubilized with polyfunctional amino compounds and include the siccative oil-modified poly-basic acids, esters or anhydrides which can be further reacted with divinyl benzene for example or acrylic acid and esters as well as polymerizable vinyl monomers. Further, substances of interest are the anodically deposited film-forming materials. However, the broad scope to which the electrodeposition of film-forming materials relates, includes the deposition of such materials on anodic or cathodic substrates, and by means of various techniques for passage of current through a bath. After electrodeposition and removal of the coated substrate from the bath, curing of the film-forming materials can be performed. The time and temperature of curing will be dependent upon the film-forming materials present, but is typically an air cure at room temperature or a forced cure at a temperature up to 500° F. and for times up to 60 minutes, at more reduced temperatures.

An additional topcoat of special interest is a coating applied by quench coating. Thus the coated substrate with the coating from the water-reducible coating composition may proceed to a quench coating, e.g., following heat curing of the water-reducible coating, as has been mentioned hereinabove, for silica substance topcoatings. Such quench coating of articles at elevated temperature by bringing them into contact with an aqueous resin solution has been discussed in Japanese Patent Application No. 53-14746. Suitable resin solutions include alkyd, epoxy, melamine and urea resins.

For this, it has also been taught, for example in U.S. Pat. No. 4,555,445, that suitable topcoating compositions may be pigmented dispersions or emulsions. These can include copolymer dispersions in liquid medium as well as aqueous emulsions and dispersions of suitable waxes. Articles can be topcoated in these compositions, which articles are at elevated temperature such as after curing of the applied water-reducible coating, by procedures including a dip-drain or a spray coating operation. By such quench coating operation, all of the topcoating curing may be achieved without further heating. Quench coating with polymeric solutions, emulsions and dispersions, and with heated baths, has also been discussed in U.S. Pat. No. 5,283,280.

Another topcoat of particular interest is the autodeposited coating. The autodeposition of coatings provides a latex-based coating film on metal articles, with no external voltage applied in the process. In the U.S. Pat. No. 3,592,699, it is taught to apply a coating from a bath of suitable polymer latex, oxidizing agent, fluoride ion and sufficient acid to maintain a pH of from about 2.5 to 3.5. Formulated as such an acidic composition, the bath can use metal dissolution as a driving force for coating deposition. More recently, U.S. Pat. No. 5,300,323 has taught a zinc surface pretreatment with an aqueous hydrogen fluoride solution containing an additive such as boric acid. This can help negate the formation of pinholes during autodeposition coating.

Before coating, it is in most cases advisable to remove foreign matter from the substrate surface, as by thoroughly cleaning and degreasing. Degreasing may be accomplished with known agents, for instance, with agents containing sodium metasilicate, caustic soda, carbon tetrachloride, trichlorethylene, and the like. Commercial alkaline cleaning compositions which combine washing and mild abrasive treatments can be employed for cleaning, e.g., an aqueous trisodium phosphate-sodium hydroxide cleaning solution. In addition to cleaning, the substrate may undergo cleaning plus etching, or cleaning plus shot blasting.

The following examples show ways in which the invention has been practiced but should not be construed as limiting the invention. In the examples, the following procedures have been employed:

Preparation of Test Panels

Unless otherwise specifically described, test panels are cold rolled, low carbon steel panels. Steel panels can be prepared for coating by first immersing in a cleaning solution. A metal cleaning solution can contain 5 ounces, per each gallon of water, of a mixture of 25 weight percent tripotassium phosphate and 75 weight percent potassium hydroxide. This alkaline bath is maintained at a temperature of about 150° F. to 180° F. Following solution cleaning, the panels can be scrubbed with a cleaning pad, which is a porous, fibrous pad of synthetic fiber impregnated with an abrasive. Thereafter, the scrubbed panels are water-rinsed and again immersed in cleaning solution. Following removal from the solution, the panels are rinsed with tap water and preferably dried.

Application of Coating To Test Parts and Coating Weight

Unless otherwise described in the examples, clean parts are typically coated by dipping into coating composition, removing and draining excess composition therefrom, sometimes with a mild shaking action, and then immediately baking or air drying at room temperature or precuring at modest temperature until the coating is dry to the touch and then baking. Baking and precuring proceeds in a hot air convection oven at temperatures and with times as specified in the examples.

Coating weights for panels, generally expressed as a weight per unit of surface area, is typically determined by selecting a panel of a known surface area and weighing it before coating. After the panel has been coated, it is reweighed and the coating weight per selected unit of surface area, most always presented as milligrams per square foot ($mg/ft^2$), is arrived at by straightforward calculation.

Coating Adhesion Test

This test is conducted by manually pressing a strip of tape coated with a pressure-sensitive adhesive against the coated surface of the test panel, which tape is then quickly removed. The coating is evaluated qualitatively according to the amount of coating removed by the adhesive on the tape, in comparison with the condition of a standard test panel.

Corrosion-Resistant Test (ASTM B117) and Rating

Corrosion-resistance of coated parts is measured by means of the standard salt spray (fog) test for paints and varnishes ASTM B-117. in this test, the parts are placed in a chamber kept at constant temperature where they are exposed to a fine spray (fog) of a 5 percent salt solution for specified periods of time, rinsed in water and dried. The extent of corrosion of the test parts can be expressed as percent of red rust.

EXAMPLE 1

To 18.9 weight parts of deionized water, there is blended with moderate agitation 3 weight parts of gamma-glycidoxypropyltrimethoxysilane and 0.6 weight part of ortho boric acid as blending continues. After mixing continues for 3 hours, there is added to this mixture an additional 29.2 weight parts of deionized water and a wetter blend containing 1.5 weight parts of a nonionic, ethoxylated nonylphenol wetter ("nenw") having a molecular weight of 396 and a specific gravity of 1.0298 at 20/20° C. and 1.5 weight parts of a nenw having a molecular weight of 616 and a specific gravity of 1.057 at 20/20° C. To this mixture there is then added an additional 2 weight parts of the above-mentioned silane, 4.1 weight parts of acetone and 0.7 weight part of 1-nitropropane. To this mixture there is added 35.2 weight parts of zinc flake paste. The zinc in flake form had a particle thickness of about 0.1 to 0.5 micron and a longest dimension of discrete particles of about 80 microns. The sum of all of these ingredients are then ground for about 3 hours using a Cowles dissolver operating at approximately 960 revolutions per minute (rpm).

To the resulting ground mixture, there is then added, while stirring is continued for 1 hour, 0.4 weight part of sodium bistridecyl sulfosuccinate anionic surfactant and mixing is then further continued overnight to prepare a test coating bath. This bath is aged for 6 days and there is then added 2.9 weight parts of additional gamma-glycidoxypropyltrimethoxysilane, with mixing. This resulting coating composition had a molar ratio of water to silane alkoxy groups of 26.7:1.

Clean 3×5-inch test panels as described hereinabove were then coated in the manner also as described hereinabove, the panels being removed from the coating composition at a rate of 3 inches per minute. Each panel is precured for 10 minutes at an oven air temperature of 150° F. and cured for 30 minutes at an oven air temperature of 600° F., all in the manner as described hereinabove. All resulting panels had a smooth, grey coating of attractive appearance. A representative panel was then subjected to the above described corrosion-resistance test. After 96 hours of testing, the panel was pulled from the test. The panel exhibited no visible red rust. Another panel having a coating weight for the panel, determined as described above, of 2,408 $mg/ft^2$ was then subjected to the above-described coating adhesion test. The panel was found to have acceptable coating adhesion.

For shelf stability testing, the resulting coating composition was stored for 8 days at room temperature in a covered container. This totaled 14 days of aging for the test coating composition when adding the 6 days of aging mentioned hereinabove. After these additional 8 days, bath stability was checked by visual inspection and by stirring, as well as by coating a panel. Bath stability was found to be acceptable on both visual inspection and stirring. Furthermore, a coated panel having a coating weight of 2,121 $mg/ft^2$, determined in the manner described above, and subjected to the coating adhesion test also as described hereinabove, displayed desirable coating adhesion.

EXAMPLE 2

The coating composition preparation of Example 1 was repeated, except that, as an initial change, the wetter blend contained 0.6 weight part of the 396 molecular weight wetter and 0.9 weight part of the 616 molecular weight wetter. A subsequent change was the use of 32.4 weight parts of dry zinc flake, instead of zinc paste. Lastly, after the 6-day aging, along with the addition of 2.9 weight parts of the silane, there was added 3 more weight parts water and 0.15 weight part of hydroxypropyl methyl cellulose thickener as an optional ingredient. The resulting coating composition had a molar ratio of water to silane alkoxy groups of 29:1.

Clean 3x5-inch test panels as described hereinabove were then coated by pouring coating composition onto the panels and then drawing down a wire wound drawdown bar on the coated panel face to provide a uniform coating. Each panel was precured for 10 minutes at an oven air temperature of 150° F. and cured for 30 minutes at an oven air temperature of 600° F., all in the manner as described hereinabove. All resulting panels had a smooth, grey coating of attractive appearance. A representative panel was then subjected to the above-described coating adhesion test. The panel was found to exhibit acceptable coating adhesion.

For shelf stability testing, the bath was stored for about 21 days at room temperature in a covered container. After 21 days, bath stability was checked by visual inspection and by stirring, as well as by coating panels. Bath stability was found to be acceptable on both visual inspection and stirring. Furthermore, a coated panel subjected to the corrosion resistance test described hereinabove, displayed corrosion resistance comparable to coatings from freshly prepared baths. Moreover, a coated panel subjected to the coating adhesion test was found to exhibit desirable coating adhesion.

What is claimed is:

1. A stable and water-reducible, chrome-free and resin-free coating composition for application to, and heat curing on, a substrate for providing corrosion protection thereto, said composition comprising:
   (A) water in an amount supplying from about 20 to about 70 weight percent of said coating composition;
   (B) low-boiling organic liquid;
   (C) particulate metal;
   (D) water-reducible, organofunctional silane binding agent containing alkoxy groups, which silane binding agent contributes from about 3 to about 20 weight percent of said coating composition; and
   (E) wetting agent;
and with the proviso that said coating composition has a molar ratio of water to silane alkoxy groups of greater than 4.5:1.

2. The coating composition of claim 1 wherein said water is present in an amount above about 25 weight percent of said coating composition and said composition has a molar ratio of water to silane alkoxy groups above about 5:1.

3. The coating composition of claim 1 wherein said composition has a pH within the range of from greater than 6 to about 7.5, contains water in an amount above about 30 weight percent, and has a molar ratio of water to silane alkoxy groups above about 6:1.

4. The coating composition of claim 1 wherein said organic liquid is present in an amount from about 1 to about 30 weight percent, basis total composition weight, and said low-boiling organic liquid is selected from the group consisting of low molecular weight alcohols, water soluble ketones, acetone and mixtures thereof.

5. The coating composition of claim 1 wherein said particulate metal is a metal powder, a metal flake, or a mixture of metal powder and metal flake, said metal powder has particle size such that all powders are more finely divided than 100 mesh, and said particulate metal is one or more of zinc, aluminum, alloys and intermetallic mixtures of zinc or aluminum, and mixtures of the foregoing.

6. The coating composition of claim 1 wherein said composition contains from about 1.5 to about 35 weight percent of particulate metal flake, basis total composition weight, and is at least substantially free of particulate metal powder.

7. The coating composition of claim 1 wherein said silane is a water-reducible, non-gelling, silane and has organofunctionality of one or more of vinyl, methacryloxy, amino, epoxy or their mixtures.

8. The coating composition of claim 7 wherein said silane is a water-reducible, epoxy functional silane, said silane is one of, or a mixture containing, beta-(3,4-epoxycyclohexyl) ethyltrimethoxy-silane, 4(trimethoxysilyl)butane-1,2 epoxide, and gamma-glycidoxypropyltrimethoxysilane and said silane is present in an amount from about 5 to about 15 weight percent, basis total composition weight.

9. The coating composition of claim 1 wherein all of said ingredients (A), (B), (C), (D) and (E) are present in one package.

10. The coating composition of claim 1 wherein said composition contains from about 0.01 to about 3 weight percent of said wetting agent, basis total composition weight, and said wetting agent is nonionic wetting agent, anionic wetting agent, or wetting agent mixture.

11. The coating composition of claim 1 further containing from about 0.05 to about 2.0 weight percent of thickener, basis total composition weight, and said thickener is selected from the group consisting of cellulosic thickener, xanthan gum, modified clays, associative thickeners, and their mixtures.

12. The coating composition of claim 11 containing from about 0.2 to about 1.2 weight percent of thickener, and said thickener is cellulosic thickener selected from the group consisting of hydroxyethylcellulose, methylcellulose, methylhydroxypropylcellulose, ethylhydroxyethylcellulose, methylethylcellulose, and mixtures thereof.

13. The coating composition of claim 1 further containing from about 0.1 to about 10 weight percent of boric acid component, basis total composition weight, with said boric acid component being selected from the group consisting of orthoboric acid, metaboric acid, tetraboric acid and boron oxide, as well as mixtures thereof.

14. The coating composition of claim 1 wherein said composition additionally contains from about 0.1 to about 2.0 weight percent of corrosion-inhibitor, basis total composition weight, with said corrosion-inhibitor being selected from the group consisting of calcium nitrate, dibasic ammonium phosphate, calcium sulfonate, 1-nitropropane lithium carbonate, and their mixtures.

15. The coating composition of claim 1 further containing high-boiling organic liquid and said high-boiling organic liquid is an oxohydroxy liquid selected from the group consisting of tri- and tetraethylene glycol, di- and tripropylene glycol, the monomethyl, dimethyl, and ethyl ethers of these glycols, liquid polypropylene glycols, diacetone alcohol, the low molecular weight ethers of diethylene glycol and mixtures of the foregoing.

16. A coated substrate protected with a chrome-free, corrosion-resistant coating from the coating composition of claim 1 and containing particulate metal, which coating is established on said substrate in an amount providing from about 500 up to about 5,000 mg/ft$^2$ of cured coating on said substrate, said coating containing said particulate metal in an amount from about 400 up to about 4,500 mg/ft$^2$ of cured coating, which coating is heat cured on said substrate by heating at a temperature within the range from about 400° F. to about 650° F. for a time of at least about 5 minutes.

17. The coated substrate of claim 16 wherein said coated substrate is further topcoated with a topcoating.

18. The coated substrate of claim 17 wherein said coated substrate is further topcoated with a substantially resin-free topcoating composition curable to a water-resistant protective coating and containing silica substance in liquid medium, which topcoating is applied in an amount sufficient to provide above about 50 mg/ft² of coated substrate of silica substance in cured coating.

19. The coated substrate of claim 18 wherein said topcoating is cured by heating at a temperature within the range from about 150° F. to about 1,000° F. for a time of at least about 10 minutes, said topcoating provides not substantially above about 2,000 mg/ft² of said silica substance in cured coating, and said topcoating provides silica substance from one or more of colloidal silica, organic silicate and inorganic silicate.

20. The coated substrate of claim 17 wherein said coated substrate is further topcoated with a topcoating composition of one or more of electrocoat primer, autodeposition coating or quench coating topcoat.

21. The method of preparing a corrosion-resistant coated substrate protected with a coating from a chrome-free, particulate-metal-containing and water-reducible coating composition, which method comprises applying as said coating composition the particulate-metal-containing coating composition of claim 1 in an amount sufficient to provide, upon curing, from about 500 to about 5,000 mg/ft² of cured coating on said coated substrate, and curing applied coating composition on said substrate at a temperature up to about 650° F. for a time of at least about 5 minutes.

22. The method of preparing the chrome-free, water-reducible coating composition of claim 1 for application to, and heat curing on, a substrate for providing corrosion-resistance thereto, which method comprises first preparing a premixture by blending together a mixture comprising silane binding agent with one or more of organic liquid and water, then admixing particulate metal with the resulting premixture.

* * * * *